United States Patent [19]

Staar

[11] 4,383,285
[45] May 10, 1983

[54] MEMORY ERROR SIGNAL DEVICES FOR TAPE CASSETTES WITH MEMORY

[75] Inventor: Theophiel C. J. L. Staar, Genappe, Belgium

[73] Assignee: Staar S.A., Belgium

[21] Appl. No.: 205,751

[22] Filed: Nov. 10, 1980

[30] Foreign Application Priority Data

Sep. 5, 1980 [BE] Belgium .................................. 201997

[51] Int. Cl.³ ....................... G11B 27/24; G11B 23/04
[52] U.S. Cl. ..................................... 360/132; 360/93; 360/137
[58] Field of Search ................. 360/132, 93, 137, 69, 360/71, 72.3; 242/197–199

[56] References Cited

U.S. PATENT DOCUMENTS

| | | |
|---|---|---|
| 3,630,170 | 12/1971 | Christo . |
| 3,661,394 | 5/1972 | Siller . |
| 3,672,604 | 6/1972 | Beaumont . |
| 3,678,215 | 7/1972 | Kihara . |
| 3,701,860 | 10/1972 | Iwawaki et al. . |
| 3,705,699 | 12/1972 | Siller . |
| 3,723,666 | 3/1973 | Ferrari . |
| 3,734,052 | 5/1973 | Feldman . |
| 3,839,736 | 10/1974 | Hoshall . |
| 3,911,492 | 10/1975 | Wilson . |
| 3,913,200 | 10/1975 | Kossor . |
| 4,210,785 | 7/1980 | Huber et al. . |

FOREIGN PATENT DOCUMENTS 2719985 11/1977 Fed. Rep. of Germany .
360725 11/1931 United Kingdom .

Primary Examiner—Alfred H. Eddleman
Attorney, Agent, or Firm—Leydig, Voit, Osann, Mayer and Holt, Ltd.

[57] ABSTRACT

For cassettes with memory for storing data relating to the cassette or the tape therein, memory error signal devices having two states representing that the cassette memory has an error or has no error, respectively, the memory error signal devices being operable between said states by a spindle member of a peripheral device. Two embodiments of memory error signal devices are disclosed, one embodiment having a capacitor, and circuit connections from said capacitor to terminals, the charged or discharged state of said capacitor constituting said two states of said device. The other embodiment has a signal plate mounted for movement between two positions, the two positions of said signal plate constituting the two states of the device, and the signal plate has terminals. The signal devices are adapted to be monitored by a peripheral device having a spindle member of unique configuration penetrating an opening in the cassette and set from a no-error to an error state by a peripheral device member having another configuration penetrating the opening. The monitoring is carried out by a monitoring circuit adapted to be connected electrically to the terminals of the signal devices.

24 Claims, 11 Drawing Figures

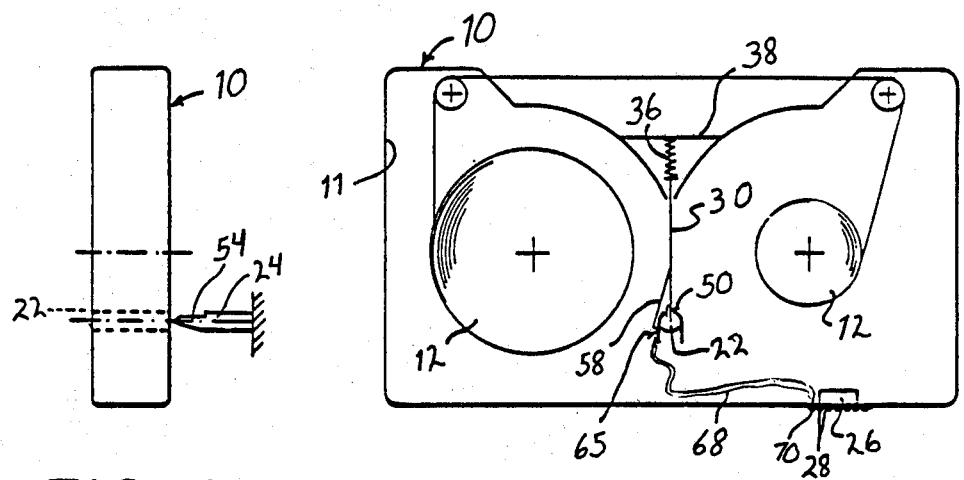
FIG. 1A
FIG. 1
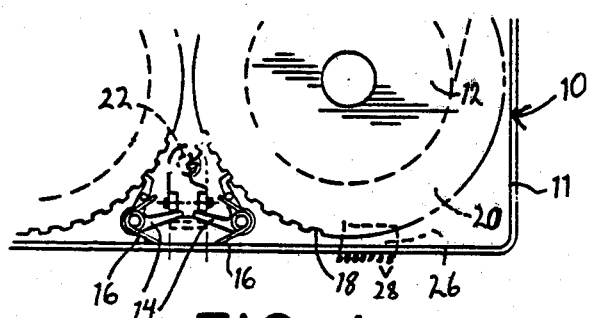
FIG. 1B
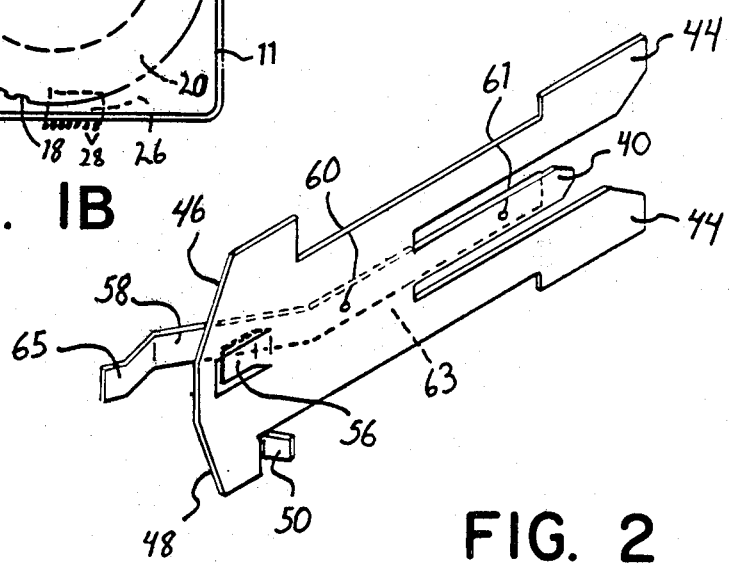
FIG. 2

MEMORY ERROR SIGNAL DEVICES FOR TAPE CASSETTES WITH MEMORY

The present invention relates to cassettes of video recording tape having an electronic memory for storing data relating to the cassette or the tape therein, and more particularly to memory error signal devices for such cassettes adapted to be monitored by a peripheral device.

Cassettes with memory circuits for storing data as to the cassettes or tapes contained within the cassettes are the subject of Staar copending application Ser. No. 087,691 filed Oct. 22, 1979, now U.S. Pat. No. 4,338,644. Said patent application additionally discloses memory error signal devices in the cassettes for representing by the state of such devices that the cassette memory has an error or has no error. Error in the data stored in such a cassette memory may occur where a cassette having electronic memory is operated in a peripheral device such as a tape deck which contains no means for updating the information in the memory representing instantaneous tape position. Said patent application discloses memory error signal devices for cassettes with memory, capable of warning the user that a cassette with memory has been introduced into a conventional tape deck apparatus not equipped to cooperate with cassette memory, and also discloses that the memory error signal devices may be utilized to operate a mechanism located on the main frame of the apparatus to actuate an electrical warning unit of the peripheral device.

The present invention has as its principal object the provision in cassettes having electronic memory, of improved memory error signal devices which represent by their state the error or no-error condition of the cassette memory, and improved apparatus for monitoring the state of the memory error signal devices.

Another object is to provide improved memory error signal devices which are simple in construction and low cost to manufacture. Further objects will appear from the accompanying drawings, in which:

FIG. 1 is a plan view of the housing of a video cassette with memory looking at the inside of one housing half, with the other housing half removed, containing a memory error signal device constructed according to this invention;

FIG. 1a is an end view of a video cassette adjacent having a spindle of unique configuration adapted to penetrate an opening in the cassette housing;

FIG. 1b is a fragmentary plan view looking at the inside of a video cassette housing illustrating means for locking the reels;

FIG. 2 is an enlarged view of a signal plate of the memory error signal device shown in assembled form within the cassette housing in FIG. 1;

Figure 3:
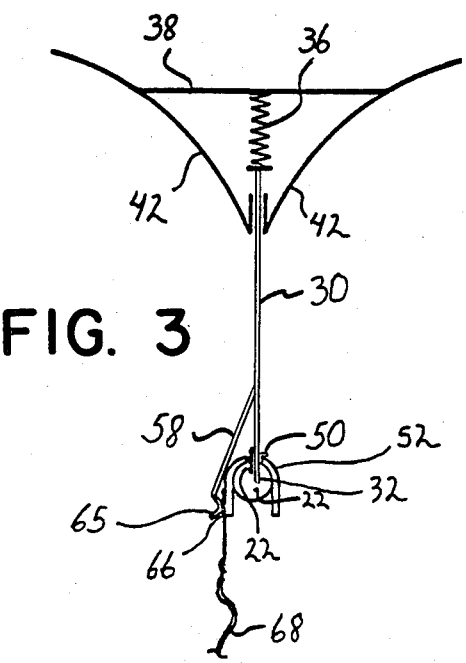
FIG. 3 is a fragmentary enlarged view of the memory error signal device shown in FIG. 1.

Referring to FIGS. 1, 1a and 1b, a video cassette 10 is illustrated having a housing 11, reels 12 of recording tape, and means for locking the reels to restrain the tape from moving and accidentally unwinding after the cassette has been removed from a tape deck apparatus. The locking means is herein shown as a pair of pivotably mounted levers 14 each urged by a spring 16 into engagement with teeth 18 on the periphery of a disk 20 associated with each reel supporting the tape in the housing 11. An opening 22 is provided in the cassette housing 11 for a spindle member 24 of a peripheral device to penetrate and unlock the reels to free the tape for movement and its function to record or playback in the tape deck apparatus or other peripheral device in which it has been introduced. It is conventional to provide such an opening 22, accessible from both faces of the cassette 10, for a cylindrical pin or spindle member 24 to penetrate the opening and engage a member operable to shift both levers 14 against the force of the springs 16 acting on the levers, out of engagement with the teeth 18 in the peripheral of the reels, thereby freeing the reels for rotational movement and the tape for movement from reel to reel. Reference may be made to said copending patent application Serial No. 087,691 for further details of the means for locking the reels, if desired.

In according with the teachings of said patent applications, an electronic memory 26 is provided preferably an electrically operable ROM (i.e. EAROM) such as a semi-conductor integrated circuit of model ER1400. The memory 26 is preferably carried inside the housing 11 on the rear edge, and means are provided on the outside of the housing serving as memory terminals 28 adapted to engage and make electrical connections to terminals of a peripheral device. A printed circuit may provide a set of conductor bars which provide the terminals 28 to the memory circuits.

Figure 5:
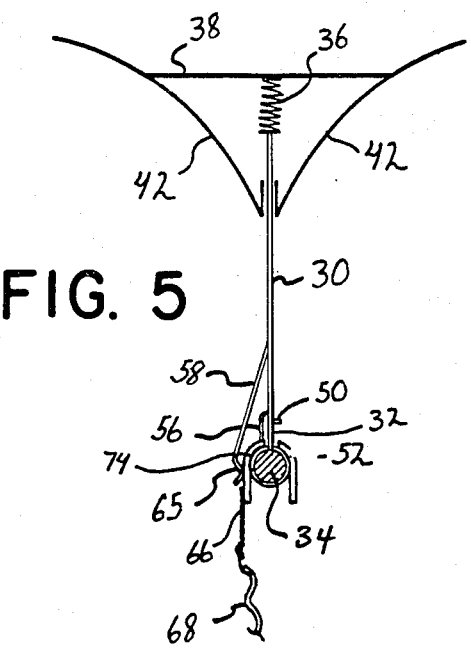
FIG. 5 is a view similar to FIG. 3 with a spindle of another apparatus penetrating the cassette opening which sets the memory error signal device in a state representing an error in the memory.
Figure 6:
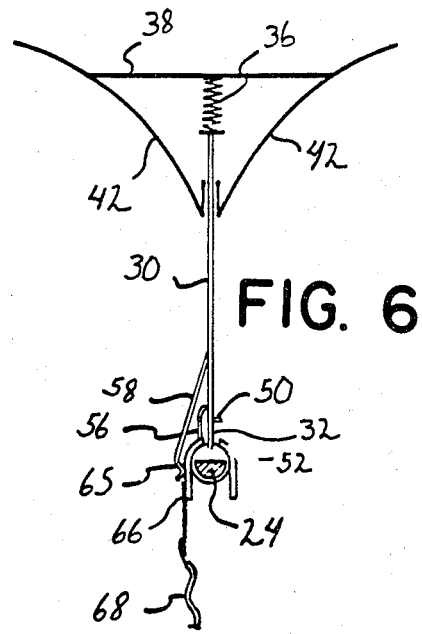
FIG. 6 is a view similar to FIG. 5 with a spindle of the kind shown in FIG. 1a penetrating the cassette housing opening.

In accordance with the present invention, within the cassette housing 11 a memory error signal device is provided, herein shown as including a signal plate 30 mounted for movement in the housing 11 between two positions, a first position shown in FIG. 3 in which the signal plate 30 has a lower terminal portion 32 extending into the path of movement of a spindle penetrating the opening 22 in the cassette housing 11, and a second position, shown in FIGS. 5 and 6. The signal plate 30 has been set in the second position of FIGS. 5 and 6, from the first position of FIG. 3, by the spindle member 34 of a peripheral device penetrating the opening as shown in FIG. 5 and moving the signal plate 30 to the second position.

The signal plate 30 is subjected to the action of a return spring 36 which holds the signal plate in its first position and opposes movement of the signal plate to its second position. The spring rests at one end against an interior wall 38 of the housing 11 and fits over a central leg 40 (FIG. 2) of the signal plate 30, which serves to support and guide the spring. The signal plate 30 is received within a gap formed between curved interior walls 42 of the cassette housing 11 which also serve to guide the plate 30 in its movement. The signal plate 30 also includes lateral legs 44 which are received in cavities provided by the two halves of the cassette housing 11, and also guide the signal plate 30 during its translatory movement.

At the end of the signal plate 30 remote from the spring, the terminal portion of the signal plate 30 which extends into the opening 22 is provided with oppositely inclined edges 46, 48. A conventional cylindrical spindle member 34 penetrating the cassette housing 11 through the opening 22 therein from either face of the cassette will engage one of the inclined edges 46, 48 and set the signal plate 30 in its second position as shown in FIG. 5. To hold the signal plate 30 in a stable first position, in which it is shown in FIG. 1, a tab 50 bent at right angles to the plane of the plate 30 is provided which as shown in FIGS. 1 and 3 rests against the circular wall 52 of the cassette housing surrounding the opening 22, the circular wall 52 having a slot therein for entry of the lower portion 32 of the signal plate 30. In the stable position shown in FIG. 1, the right angle tab 50 forms a stop which rests against the generally circular cassette wall 52 surrounding the opening 22.

In carrying out the invention, the state of the memory error signal device is monitored by a monitoring circuit of a peripheral device, the two positions of the memory error signal device constituting two states representing that the memory of the cassette has an error or has no error, respectively. For this purpose, the memory error signal device is adapted to be monitored by a peripheral device having a spindle member 24 of unique configuration penetrating the opening 22 and engaging the portion of the signal device adjacent the opening, in the present case projecting into the opening 22 as indicated in FIGS. 2 and 6. An example of a peripheral device having a unique configuration adapted to cooperate with a memory signal device of this invention is the spindle 24 which has a semi-cylindrical tip portion 54, as shown in FIG. 1a, which is adapted to engage and make electrical connection with the signal plate portion 30 extending into the opening 22 when the plate is in the first position (FIG. 1), without changing the position of the signal plate 30. Further in keeping with the invention, the signal device is adapted to be set from its first to its second position by a peripheral device having another configuration penetrating the opening and engaging the signal device, namely a cylindrical spindle conventionally found on video cassette tape decks for unlocking the reels.

Thus, the signal plate 30 further includes a tab 56 which is cut out of the plate 30 to project along the longitudinal axis of the plate, and which provides an element for locking the plate 30 in its second position after the plate is set in that position. The tab 56 abuts the cassette wall 52 surrounding the opening 22, as shown in FIGS. 5 and 6, to lock the plate 30 in its second position.

Figure 4:
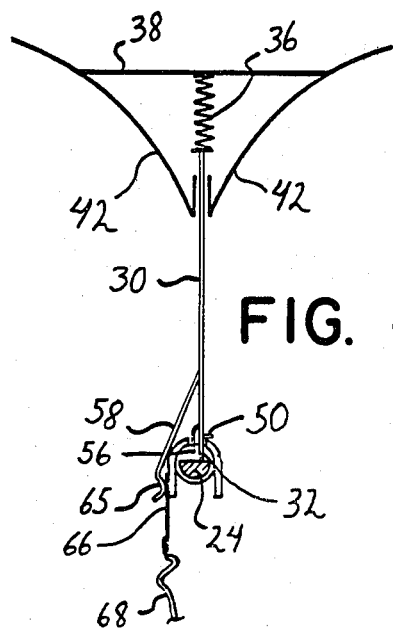
FIG. 4 is a view similar to FIG. 3 with a spindle of the kind shown in FIG. 1a penetrating the cassette opening.

For the purpose of establishing a circuit adapted to be connected to a peripheral device for monitoring the state of the signal plate 30, the signal plate 30 includes a contact blade 58 which is attached to the plate 30 along the longitudinal axis by means such as rivets 60, 61 located in the central leg 40 and main section 63 of the signal plate 30. The contact blade 58 forms an acute angle to the plane of the signal plate 30 and has a reversely bent end 65 which, as shown in FIGS. 1, 3 and 4, makes electrical contact with a fixed lug 66 when the signal plate 30 is in its first position or state. The fixed lug 66 is connected to a circuit means including a wire 68 and a conductive bar on the outside of the cassette housing 11 adjacent the set of memory terminals 28 and serving as a terminal 70 for connection to a peripheral device. The circuit means 68, 70, contact blade 58 and signal plate 30 provide a circuit adapted to be connected to a peripheral device for monitoring the state of the signal device. Such connections to a peripheral device may be made by the terminal 70 on the outside of the cassette housing 11 and by a grounded return provided by the spindle 24 for unlocking the reels of the cassette, as shown in FIG. 1a. The semi-cylindrical tip portion 54 of the spindle 24 is adapted to engage and make electrical connection with the signal plate portion 32 extending into the opening 22 in the cassette housing 11 when the plate is in the first position (as shown in FIG. 4) without changing the position of the signal plate 30.

In carrying out the invention, tape deck apparatus for receiving cassettes with electronic memory means includes fixed terminals mounted on the tape deck apparatus which are engaged by the terminals 28 on the cassette housing 11 as the cassette is moved essentially edgewise into its operative position. Tape deck apparatus for receiving cassettes with electronic memory means is described in detail in the above-mentioned patent application Ser. No. 087,691 and includes tape and reel drives and motors for operating the drives which are in turn controlled by a controller described as a microprocessor based control means. The tape deck apparatus includes, in addition to the controller means, display means connected to the controller means and operated thereby. Display means is provided for displaying different types of information or data relating to the cassettes or the tapes in the cassettes, for example, instantaneous tape position which may be represented in terms of time remaining to the end of the tape or from the beginning of the tape, or both, as well as other types of information or data such as titles and/or locations or selections, or an index of titles.

Tape deck apparatus so equipped with means for connection to the terminals 28 of the memory means of a cassette as an incident to introduction of the cassette into the apparatus, in keeping with the present invention, also will be provided with terminals for interengagement with the terminal 70 connected to the circuit including the signal plate 30 for monitoring the state of the signal plate. Such apparatus which enables the use of the cassette memory also is provided with a spindle having the unique configuration 54 shown in FIG. 1a for penetrating the opening 22 in the cassette housing and unlocking the cassette reels without changing the position of the signal plate 30. For this purpose the spindle 24 has the semi-cylindrical tip portion 54 which as shown in FIG. 4 makes electrical connection to the signal plate 30 without changing its position. Thus a complete circuit is made through the signal plate 30, the contact blade 58, lug 66 and circuit means including the wire 68 and terminal 70, to the peripheral device, thereby enabling the peripheral device to determine that the signal plate 30 is in its first state.

When a cassette having memory means is introduced into a tape deck apparatus not equipped with means for cooperating with the memory of the cassette, and having a spindle of another configuration such as a spindle with a conventional cylindrical tip 34, when the cassette is inserted into such tape deck apparatus the cylindrical tip 34 of the spindle penetrates the opening 22 of the housing 11 and engages the portion 32 of the signal plate 30 extending into the opening 22, as shown in FIG. 5. The engagement by the tip 34 of the spindle with one of the inclined edges 48, 50 on the portion 32 of the signal plate 30 extending into the opening 22 causes the signal plate 30 to be moved against the force of its return spring 36 and shifted by the cylindrical spindle through the slit 52 in the wall 74 of the cassette opening 22. The signal plate 30 is slid outward through the slit 52 far enough to carry the locking tab 56 completely outside the opening 22 in the cassette housing as shown in FIG. 5. Due to the springiness of the contact blade 58, a lateral force is exerted on the signal plate 30 in the direction tending to tilt the plate slightly in a counterclockwise direction as viewed in FIGS. 3-6, which has the effect when the locking tab 56 is completely out of the cassette opening 22 to cause the end of the locking tab 56 to bear against the outer wall 74 surrounding the cassette opening 22, as shown in FIG. 5. This locking tab 56 prevents the return movement of the signal plate 30 after the cassette is removed from the tape deck apparatus and the cylindrical spindle is removed from the cassette opening, and provides a second stable position or state of the signal plate.

To enable the position of the signal plate 30 to be monitored, the lug 66 of the circuit means is located, as shown in FIG. 5, such that the movement of the signal plate 30 from its first to its second position removes the contact blade 58 from electrical contact with the lug 66, which opens the circuit including the circuit means 68, 70, contact blade 58 and signal plate 30. Thus, when a cassette equipped with memory is inserted in a tape deck apparatus having a conventional cylindrical spindle, the signal plate 30 is shifted to its second state, the state of the signal plate 30 indicating that the memory unit may contain an error as to the position of the tape.

When a cassette with memory is inserted into a peripheral device such as a tape deck apparatus equipped to cooperate with the memory means, and having a terminal for connection to the circuit means terminal 70 for monitoring the state of the signal plate 30, the setting of the signal plate in its second position will be sensed. The tape should be rewound to the beginning and the memory cleared of data relating to tape position, so that fresh data will contain no error. Once the tape has been rewound to the beginning, the signal plate may be returned to the position of FIG. 4 from the position of FIG. 6 by tilting the signal plate 30 laterally, clockwise as viewed in FIG. 6, to bring the locking tab 56 in alignment with the slit 52 in the wall of the cassette opening so that the signal plate 30 will be caused to enter the opening by the return spring 36 and reset to the position shown in FIG. 4. A pencil point inserted into the cassette opening and engaging the signal plate at its lower portion 32 may be used for this purpose.

Figure 7:
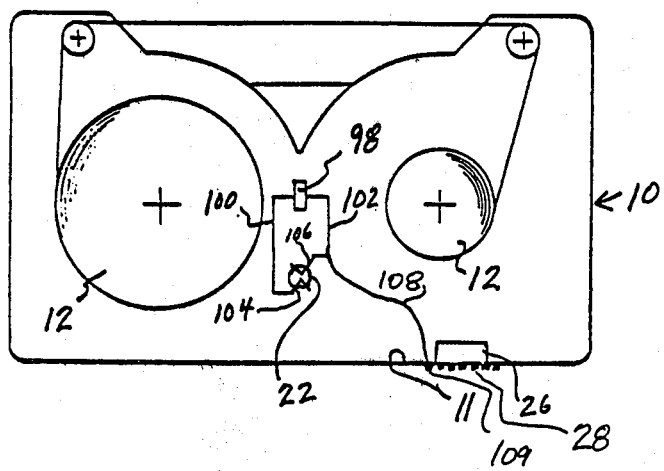
FIG. 7 is a plan view of a cassette housing having an alternative form of memory error signal device, taken looking inside one half of the cassette housing with the other half removed.
Figure 8:
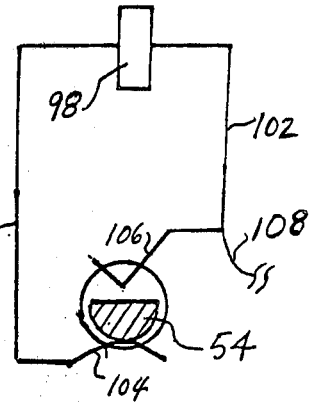
FIG. 8 is an enlarged view of the memory error signal device illustrated in FIG. 7, which includes a capacitor that may be set in a state representing an error in the memory.

Now turning to FIGS. 7 and 8, an alternative preferred embodiment of memory error signal device for cassette with memory is illustrated. As in the embodiment of the invention shown in FIGS. 1-6, the memory error signal device is adapted to be monitored by a peripheral device (FIG. 8) including a spindle having a unique configuration, herein shown as a member having a semi-cylindrical tip portion 54 as shown in FIG. 1a.

In accordance with this embodiment of the invention, the memory error signal device comprises a capacitor 98, and circuit connections 100, 102 to bent contacts 104, 106 which are mounted in the cassette housing 11 to provide terminal elements adjacent the opening 22 in the cassette housing. The memory error signal device is adapted to be set from a first to a second state by a conventional spindle penetrating the opening 22 engaging the terminals 104, 106. Using a conventional cylindrical spindle of a peripheral device, which spindle is grounded, by penetrating the peripheral device in the opening 22 and engaging the terminals 104, 106, the capacitor 98 is discharged, the discharged state constituting the second "error" state of the device. Thus, when a cassette with memory is inserted into a tape deck apparatus, or other peripheral device, not equipped to cooperate with the memory means of the unit, the conventional spindle of such a device is operable to discharge the capacitor 98 and thus set the memory error signal device in its error state.

Further in carrying out the invention, the terminal 104 and circuit connections 102, 108 leading to a terminal 109 on the outside of the cassette housing 11 adjacent the terminals 28 of the memory 26, provide a circuit adapted to be connected to a monitoring circuit of a peripheral device for monitoring the state of the capacitor 98. For this purpose, the terminals 104, 106 are located in the opening 22 and so configured that a spindle having a unique tip configuration 54 makes electrical contact with the signal device terminal 104 but does not contact the signal device terminal 106. In this manner the state of the capacitor 98 may be monitored by a circuit of a peripheral device, connected to the capacitor 98 by means of the terminal 109, the circuit being completed through the terminal 104 and the spindle tip 54 which is grounded, providing a grounded return.

Figure 9:
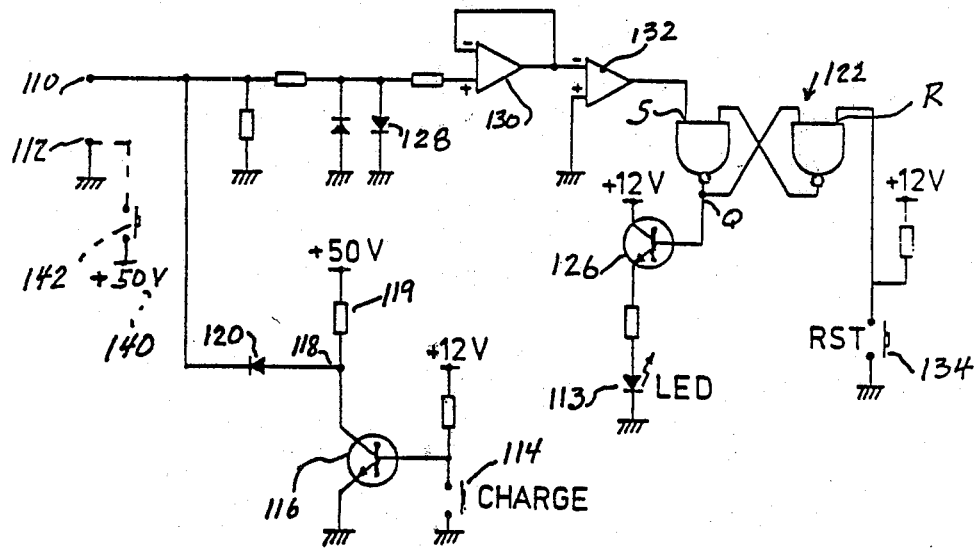
FIG. 9 is a schematic diagram of a monitoring circuit of a peripheral device for monitoring the state of memory error signal devices constructed according to this invention.

Thus, referring to FIG. 9, in carrying out the invention a monitoring circuit is provided for a peripheral device, for monitoring the state of the memory error signal device of this invention as disclosed in FIG. 7. With modifications, this monitoring circuit may also be used for monitoring the state of the memory error signal device of this invention as disclosed in FIGS. 1-6.

The monitoring circuit has a terminal 110 adapted to be connected to the terminal 109 on the outside of the cassette 10 shown in FIG. 7. The monitoring circuit includes a detecting and display section including an LED 113 for detecting the state of charge of the capacitor 98 of a memory error signal device and for providing a visual signal of a memory no-error state. The monitoring circuit also includes a charge section for transferring a source voltage to a memory error signal device of a cassette, to charge the capacitor 98 prior to the removal of the cassette from a peripheral device after the cassette memory has been updated with accurate tape position data, and thereby set the capacitor in its charged state representing the no-error state of the memory.

Referring to the charge section of the monitoring circuit, this section includes a charge pushbutton 114 connected in the base circuit of a transistor 116. With the pushbutton 114 open, the base-collector junction of the transistor 116 is reverse biased and the base-emitter junction is forward biased so that the transistor 116 is nonsaturated and effectively acts as an open circuit at the node 118. When the charge pushbutton 114 is actuated either manually or automatically, for example prior to removal of a cassette from the peripheral device, the forward bias is removed from the base-emitter junction which turns the transistor 116 off, the 50-volt source is effectively connected through a resistor 119 and a diode 120 to the output terminal 110, and the source voltage is transmitted to the capacitor 98 to recharge the capacitor to its maximum level of 50 volts. The diode 120 blocks the discharge of the capacitor 98 through the charge section of the circuit when the charge pushbutton 114 is released. By this means, a capacitor 98 is set in its no-error state representing that the memory contains accurate data as to tape position, so that when the cassette is next inserted in a peripheral device having means for cooperation with the cassette memory and a monitoring circuit as disclosed herein, the state of the capacitor can be detected to determine that the memory contains accurate tape position data.

The detecting and display section of the monitoring circuit includes the LED 113 which functions as a signal light to visually display the no-error state of the capacitor 98 when that state is detected by the monitoring circuit. The detection and display section also includes a flip-flop latch 122 which turns the LED signal light 113 on when the circuit detects that the capacitor 98 is charged. The circuit is operative to detect the full charged state of the capacitor, and a partially discharged state which may be caused by a gradual discharge of the capacitor 98 during a long period of nonuse. It is one of the features of the invention, however, that a cassette equipped with a memory error signal device of the kind shown in FIG. 8 may be left for long periods without the capacitor 98 fully discharging, sufficient charge being maintained to trigger the monitoring circuit and indicate that the cassette memory is accurate. This feature is obtained without any power source being required in the cassette itself, the charged capacitor providing the memory no-error signal.

To achieve this, the detection and display section of the monitoring circuit is connected to the terminal 110 which is adapted to be connected to the terminal 109 of a cassette with memory to detect the charge on the memory error signal device capacitor in the cassette. The input terminal 110 is connected to the input of an operational amplifier 130 which is connected to act as a voltage follower and impedence buffer, and the output of the operational amplifier 130 is connected to a second operational amplifier 132 acting as an inverter. Thus a voltage received on the input terminal 110 from the capacitor 98 of the memory error signal device, reflecting that the capacitor 98 is charged, is transferred through the amplifier circuits and inverted so that it is applied as a low or binary zero to the set input S of the flip-flop latch 122. This sets the Q output of the latch 122 to a high or binary one level, which applies a forward bias to the base-emitter junction of a transistor 126 in series with the LED 113 and turns the transistor 126 on to energize the LED 113. With the monitoring circuit left connected to the capacitor 98, the charge on the capacitor is discharged through the diode 128. This produces a high or binary one on the set input S of the latch 122 which maintains the same output state.

When the cassette is removed from the peripheral device, as previously noted the charge pushbutton 114 is actuated to charge the capacitor 98 of the memory error signal device. In addition, the reset pushbutton 134 is actuated either manually or automatically which produces a low or binary zero on the reset input R of the latch 122, and a change in the Q output from the high to the low level which turns off the LED 113. When the reset pushbutton 134 is released, the low on the Q output remains.

The operation of the NAND gate latch 122 is summarized by the following truth table.

| INPUTS | | OUTPUT | |
| --- | --- | --- | --- |
| S | R | Q | STATE |
| 1 | 1 | 0 | LED off |
| 0 | 1 | 1 | Capacitor 98 is charged - LED turns on |
| 1 | 1 | 1 | Cassette removed |
| 1 | 0 | 0 | Reset pushbutton actuated - turns off LED |
| 1 | 1 | 0 | Reset pushbutton released - LED off |

If desired, the monitoring circuit may also be implemented with means to detect the error state of the capacitor 98, and to cause the signal LED 113 to flash or otherwise represent the error state of the cassette memory.

As previously noted, the monitoring circuit may be modified to operate in conjunction with a memory error signal device of the kind shown in FIGS. 1-6, to detect a no-error state of the device. For example, the terminal 112 may be connected to a voltage source 140 through a pushbutton switch 142, and the spindle 24 connected to the terminal 110 instead of being grounded as shown in FIG. 1a. In this case, the terminal 112 is mounted on the peripheral device so as to be engaged by the terminal 70 on the cassette housing 11 (FIG. 1), as the cassette is inserted into the peripheral device. Upon actuation of the pushbutton 142, the voltage from the source 140 will be transmitted through the terminal 70, circuit means 68, 65 and signal plate 30 to the spindle 24, and from the terminal 110 to the detection and display section of the monitoring circuit to energize the LED 113, representing that the signal plate of the memory error signal device of the cassette is positioned in its no-error state. Upon switching off the voltage source 140 by releasing the pushbutton 142, the visual signal of the LED 113 will remain on until the latch 122 is reset.

When the memory error signal plate 30 is in its error state due to the cassette with memory having been operated in a peripheral device having no means for updating the memory with accurate tape position data, the signal plate 30 will be located in its error position (FIG. 6). An open circuit condition is produced in the circuit means including the signal plate 30 due to the separation of the contact blade 58 from the lug 66; this error state of the memory error signal plate 30 will be represented by the failure of the LED 113 to be energized, thereby visually signalling the operator of the error in cassette memory.

I claim:

1. A cassette of recording tape having a housing, tape and reel means, means for restraining tape from moving, an opening in said housing for a member of a peripheral device to penetrate to free tape for movement, an electronic memory in said housing for storing data relating to said cassette or the tape therein, and a memory error signal device in said housing having two states representing that said memory has an error or no error, respectively, said memory error signal device having terminal means for establishing an electrical connection to a peripheral device for monitoring and for changing the state of said signal device, said terminal means including an element adjacent said opening and in the path of a peripheral device member penetrating said opening.

2. A cassette of recording tape according to claim 1, said signal device being adapted to be monitored by a peripheral device having a member of unique configuration penetrating said opening and engaging said element, and set from a first to a second state by a peripheral device member having another configuration penetrating said opening and engaging said element.

3. A cassette of recording tape according to claim 1, wherein said signal device comprises a capacitor, and circuit connections from said capacitor to said terminal means including said element adjacent said opening, the charged or discharged state of said capacitor constituting said two states of said device.

4. A cassette of recording tape according to claim 3, wherein said terminal means and circuit connections provide a circuit adapted to be connected to a peripheral device for monitoring the state of said capacitor.

5. A cassette of recording tape according to claim 4, wherein said signal device is adapted to be monitored by a peripheral device having a member of unique configuration including a spindle member having a semi-cylindrical portion engaged by said terminal element, and control circuit means adapted to be connected to said terminal means of said signal device.

6. A cassette of recording tape according to claim 1, wherein said signal device comprises a signal plate mounted for movement in said housing between two positions, the two positions of said signal plate constituting said two states of said device, and having a portion extending into said opening, when said plate is in a first position, for engagement by a member of a peripheral device penetrating said opening and movement thereby to a second position.

7. A cassette of recording tape according to claim 6, wherein said signal plate includes a contact blade, and circuit means in said housing contacted by said contact blade when in said first position including a terminal, said circuit means, contact blade and signal plate providing a circuit adapted to be connected to a peripheral device via said terminal and said member for monitoring the state of said signal device.

8. A cassette of recording tape according to claim 7, wherein said circuit is adapted to be connected to a peripheral device for monitoring the state of said signal device, said peripheral device having a member of unique configuration including a spindle member having a semi-cylindrical tip portion adapted to engage and make electrical connection with said signal plate portion extending into said opening when said plate is in said first position without changing the position of said signal plate.

9. A cassette of recording tape according to claims 6, 7 or 8, wherein said signal plate portion has inclined camming edges for engagement by a peripheral device spindle member penetrating said opening and movement thereby to a second position.

10. A cassette of recording tape according to claim 1, having a signal device adapted to be monitored by a peripheral device having a unique configuration comprising a spindle member for establishing electrical connection with said element of said error signal device without changing the state of said signal device.

11. In combination,
a cassette of recording tape having a housing, reel means for tape in said housing, means for restraining said tape against movement, an opening in said housing for a peripheral device to penetrate to free said tape for movement, an electronic memory in said housing for data relating to said cassette or tape therein, and a memory error signal device having two states representing, respectively, that said memory has an error or no error, and having terminal means including an element adjacent said opening,
and
a peripheral device including means for monitoring said memory error signal device including a member for penetrating said opening and freeing said tape, said member having a portion engaging said signal device element adjacent said opening for establishing electrical connection therewith without changing the state of said signal device, said monitoring means including circuit means adapted to be electrically connected to said terminal means and said signal device via said terminal means and said member, for monitoring the state of said signal device.

12. The combination according to claim 11, said memory error signal device comprising a capacitor, and circuit connections from said capacitor to said terminal means including an element adjacent said opening, the charged or discharged state of said capacitor constituting said two states of said device.

13. The combination according to claim 12, said portion of said member of said peripheral device having a unique configuration for engagement with said terminal element when said member penetrates said opening for establishing electrical connection with said capacitor without changing the charged state thereof.

14. The combination according to any of claims 12 or 13, said monitoring circuit including connections to monitor the state of said capacitor by detecting a charge on said capacitor.

15. The combination of any of claims 12 or 13, said portion of said member having a unique semi-cylindrical configuration for engagement with said terminal element.

16. A cassette according to claim 1, said memory error signal device comprising a signal plate mounted for movement in said housing between two positions, the two positions of said signal plate constituting said two states of said device, and having a terminal element extending into said opening, when said plate is in a first position, for engagement by said peripheral device member penetrating said opening, said member having a unique configuration formed by a tip portion shaped to extend into said opening and make electrical connection with said signal plate terminal element without changing the position of said signal plate.

17. A cassette according to claim 16, said terminal including a terminal means on said cassette housing, circuit means connecting said signal plate to said terminal when said plate is in said first position, said terminal being adapted to be connected to said monitoring circuit for the latter to monitor the state of said signal plate by detecting the position of said plate.

18. A cassette according to claim 16, said signal plate having a contact blade, circuit means mounted in said cassette housing and engaged by said contact blade when said plate is in said first position, the movement of said signal plate to the second position opening the circuit between said contact blade and circuit means, said circuit means including a terminal on said cassette housing adapted to be connected to said monitoring circuit for the latter to monitor the state of said signal plate, the state of said signal plate being represented by the closed or open circuit, respectively, between said contact blade and circuit means.

19. The combination according to claim 11, 12, or 13, said means for monitoring the state of said memory error signal device further comprising a monitoring circuit including terminals adapted to be connected via said terminal means including said member to receive signals from said memory error signal device representing one state of said device, and display means connected to be energized responsive to said signals.

20. The combination according to claim 11, 12, or 13, said means for monitoring the state of said memory error signal device further comprising a monitoring circuit including terminals adapted to be connected via said terminal means including said member to receive signals from said memory error signal device representing one state of said device, a flip-flop latch having a low output in its normal state, circuit means for operating a set input of said flip-flop latch responsive to said signals for setting the latch and producing a high output from said latch, display means connected to be energized responsive to said signals, and means for resetting said latch and for de-energizing said display means.

21. The combination according to claim 13, said means for monitoring the state of said memory error signal device further comprising a monitoring circuit including terminals adapted to be connected to detect a charge on said capacitor, the charged or discharged state of said capacitor constituting said two states of said device, a detecting and display section including display means connected to be energized responsive to a charge detected on said capacitor, and a charge section connected to transmit a source voltage to said capacitor via said terminals to set said capacitor in its charged state.

22. A cassette of recording tape according to claim 1, said memory error signal device comprising a capacitor and circuit connections from said capacitor to said terminal means including an element adjacent said opening, the charged or discharged state of said capacitor constituting said two states of said device.

23. A cassette of recording tape according to claim 1 wherein said signal device comprises a capacitor settable in two different states of charge.

24. A cassette of recording tape according to any of claims 3, 4, 5 or 23, said terminal means further including a terminal carried on the periphery of said cassette housing for establishing an electrical connection to a peripheral device.

* * * * *